(12) United States Patent
Cherukuri et al.

(10) Patent No.: US 7,711,878 B2
(45) Date of Patent: May 4, 2010

(54) METHOD AND APPARATUS FOR ACKNOWLEDGEMENT-BASED HANDSHAKE MECHANISM FOR INTERACTIVELY TRAINING LINKS

(75) Inventors: Naveen Cherukuri, San Jose, CA (US);
Sanjay Dabral, Palo Alto, CA (US);
David S. Dunning, Portland, OR (US);
Tim Frodsham, Portland, OR (US);
Theodore Z. Schoenborn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 10/851,369

(22) Filed: May 21, 2004

(65) Prior Publication Data
US 2005/0262280 A1 Nov. 24, 2005

(51) Int. Cl.
*G06F 13/42* (2006.01)
*G08C 25/02* (2006.01)
*H04L 1/18* (2006.01)
*G06F 15/16* (2006.01)

(52) U.S. Cl. .................... 710/106; 714/748; 714/749; 709/230; 709/231; 709/232; 709/237

(58) Field of Classification Search .............. 710/106; 714/748, 749; 709/230–232, 237
See application file for complete search history.

(56) References Cited

U.S. PATENT DOCUMENTS

| 5,701,416 | A | | 12/1997 | Thorson et al. |
|---|---|---|---|---|
| 5,809,331 | A | | 9/1998 | Staats et al. |
| 5,870,428 | A | | 2/1999 | Miller et al. |
| 6,002,882 | A | * | 12/1999 | Garde ............................ 712/35 |
| 6,009,488 | A | | 12/1999 | Kavipurapu |
| 6,038,606 | A | * | 3/2000 | Brooks et al. ................ 709/235 |
| 6,195,702 | B1 | * | 2/2001 | Cole et al. .................... 709/237 |
| 6,356,106 | B1 | * | 3/2002 | Greeff et al. ................... 326/30 |
| 6,442,712 | B1 | * | 8/2002 | Jeon ............................. 714/43 |
| 6,690,757 | B1 | | 2/2004 | Bunton et al. |

(Continued)

FOREIGN PATENT DOCUMENTS

JP 10145419 A * 5/1998

(Continued)

OTHER PUBLICATIONS

Wang et al., "Predicting Link Quality Using Supervised Learning in Wireless Sensor Networks", Jul. 2007, ACM, ACM SIGMOBILE Mobile Computing and Communications Review, Volumn 11, Issue 3, pp. 71-83.*

(Continued)

*Primary Examiner*—Mark Rinehart
*Assistant Examiner*—Faisal M Zaman
(74) *Attorney, Agent, or Firm*—Blakely, Sokoloff, Taylor & Zafman LLP (57) ABSTRACT

A method and apparatus for advancing initialization messages when initializing an interface is presented. In one embodiment, one of a sequence of training sequence messages are sent in serial mode across the data lanes of a generally-parallel interface between two agents. When one agent correctly receives a fixed number of messages, it may begin sending its messages with an acknowledgement. Thereafter, when that agent correctly receives a fixed number of messages including an acknowledgement, that agent may advance to sending the next training sequence messages in the sequence.

38 Claims, 6 Drawing Sheets

U.S. PATENT DOCUMENTS

| | | | |
|---|---|---|---|
| 6,766,464 B2 * | 7/2004 | Collier | 713/503 |
| 6,829,641 B2 * | 12/2004 | Schenkel et al. | 709/224 |
| 6,880,026 B2 * | 4/2005 | Imming et al. | 710/106 |
| 6,925,077 B1 | 8/2005 | Acharya | |
| 6,985,502 B2 | 1/2006 | Bunton | |
| 6,996,643 B2 * | 2/2006 | Wolfe et al. | 710/105 |
| 7,010,607 B1 * | 3/2006 | Bunton | 709/228 |
| 7,233,996 B2 * | 6/2007 | Kaniyur et al. | 709/227 |
| 7,386,626 B2 * | 6/2008 | Kota et al. | 709/232 |
| 7,395,347 B2 * | 7/2008 | Nemawarkar et al. | 709/232 |
| 7,437,643 B2 * | 10/2008 | Khanna et al. | 714/733 |
| 7,454,514 B2 * | 11/2008 | Lesartre et al. | 709/232 |
| 7,512,695 B2 * | 3/2009 | Talaat et al. | 709/230 |
| 2002/0046379 A1 * | 4/2002 | Miki et al. | 714/749 |
| 2002/0103995 A1 | 8/2002 | Owen et al. | |
| 2002/0165973 A1 * | 11/2002 | Ben-Yehezkel et al. | 709/230 |
| 2003/0226072 A1 * | 12/2003 | Bruckman et al. | 714/716 |
| 2003/0236995 A1 | 12/2003 | Fretwell | |
| 2004/0071250 A1 * | 4/2004 | Bunton et al. | 375/372 |
| 2004/0236802 A1 * | 11/2004 | Baratakke et al. | 707/204 |
| 2005/0013246 A1 * | 1/2005 | Miyake et al. | 370/230 |
| 2005/0017756 A1 | 1/2005 | Priborsky | |
| 2005/0024926 A1 | 2/2005 | Mitchell et al. | |
| 2005/0027880 A1 | 2/2005 | Emmot | |
| 2005/0132214 A1 * | 6/2005 | Naftali | 713/200 |
| 2005/0152386 A1 * | 7/2005 | Lesartre et al. | 370/428 |
| 2005/0154946 A1 | 7/2005 | Mitbander et al. | |
| 2005/0225426 A1 * | 10/2005 | Yoon et al. | 340/3.21 |
| 2005/0251595 A1 * | 11/2005 | Lesartre | 710/71 |
| 2005/0270988 A1 | 12/2005 | DeHaemer | |
| 2005/0286567 A1 | 12/2005 | Cherukuri et al. | |
| 2006/0041696 A1 | 2/2006 | Cherukuri et al. | |

FOREIGN PATENT DOCUMENTS

| | | | |
|---|---|---|---|
| JP | 2004350266 A | * | 12/2004 |
| JP | 2005182485 A | * | 7/2005 |
| JP | 2005236854 A | * | 9/2005 |
| JP | 2006115070 A | * | 4/2006 |
| WO | WO 9738377 A1 | * | 10/1997 |

OTHER PUBLICATIONS

Won-ok Kwon; Hyuk-je Kwon; Kyoung Park, "PCI Express multi-lane de-skew logic design using embedded Serdes FPGA," Solid-State and Integrated Circuits Technology, 2004. Proceedings. 7th International Conference on , vol. 3, no., pp. 2035-2038 vol. 3, Oct. 18-21, 2004.*

Nejedlo, J.J., "IBIST™ (interconnect built-in-self-test) architecture and methodology for PCI Express," Test Conference, 2003. Proceedings. ITC 2003. International , vol. 2, no., pp. 114-122 vol. 2, Sep. 30-Oct. 2, 2003.*

Eric Johnson, "Structural Testing of High-Speed Serial Buses: A Case Study Analysis," Test Conference, 2006. ITC '06. IEEE International , vol., no., pp. 1-9, Oct. 2006.*

Infiniband, Wikipedia.

Building the Next Generation of Extensible Mesh Fabrics, CommsDesign Jan. 27, 2003.

Clock Control (http://iram.cs.berkely.edu/serialio//cs254/control logic/).

Infinibad Sepcification, Release 1.0, vol. 2, pp. 98-109 and 125-127, Oct. 4, 2000.

The Emergence of PCI Express, Intel Technology Journal, Feb. 17, 2005.

Non Final Rejection mailed Feb. 1, 2006; U.S. Appl. No. 10/850,810.

Final Rejection mailed Jul. 3, 2006; U.S. Appl. No. 10/850,810.

Non Final Rejection mailed Nov. 13, 2006; U.S. Appl. No. 10/850,810.

Final Rejection mailed Apr. 24, 2007; U.S. Appl. No. 10/850,810.

Burdrak, et al., "PCI Express System Architecture", *PCI Express System Architecture*, addison-Wesley, US, Sep. 30, 2003, pp. 94-95.

* cited by examiner

METHOD AND APPARATUS FOR ACKNOWLEDGEMENT-BASED HANDSHAKE MECHANISM FOR INTERACTIVELY TRAINING LINKS

FIELD

The present disclosure relates generally to data interfaces between agents, and more specifically to point-to-point data interfaces requiring initialization before general operations of data transfer between the agents.

BACKGROUND

Microprocessor systems have until recently been interconnected via multi-point drop data buses. The processors, memory controllers, input-output controllers (which may generally be termed "agents") would be able to exchange data over a common data bus structure. However, as data transmission rates become higher, limitations in the multi-point drop data buses are becoming a problem. The electrical loadings and reflections in a multi-point drop data bus system may limit the data transmission speed. In order to address these and other issues, newer systems are examining individual, dedicated point-to-point data interfaces between the agents of a system.

There will still exist variances among agents attempting to exchange data via the point-to-point interfaces. Source impedances, path impedances, and termination impedances may all vary due to process variations and other influences. Data skew among the various parallel data lines, and between the clock and data lines, may become more of a problem at higher data rates. For this reason, during an initialization process the two agents at the opposite ends of the point-to-point interface may exchange special data messages to support the initialization process. For example, pre-determined data messages may help initialize a set of deskewing buffers in a parallel interface. It would be possible to simply send a large number of such messages and presume that the two agents would successfully receive and act upon a sufficient number of them. However this may prove to be a time-consuming process. If the process consumes too much time, it may impact system performance if the initialization is needed not just on a relatively-rare system reset event, but also on commonly occurring events such as transitions between normal operating modes and low-power operating modes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for handshaking with acknowledgement to initialize a series of individual data lanes into data links is shown. In the following description, numerous specific details such as logic implementations, software module allocation, signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments the invention is disclosed in the form of an interface for connecting together several Itanium® Processor Family (IPF) compatible processors, or for connecting together several Pentium® compatible processors, such as those produced by Intel® Corporation. However, the invention may be practiced for interconnecting other kinds of processors, such as an X-Scale® family compatible processor (but not limited to any family of processor), or for interconnecting other forms of agents, such as memory hubs or input/output device hubs or chipsets. The invention may also be practiced in the interfacing of mixed kinds of processors or other agents. Finally, the invention may be practiced in dedicated point-to-point interfaces, where either the sending and receiving of data occur on a pair of one-directional links, or where the sanding and receiving of data occur on simultaneous bi-directional links.

Figure 1:
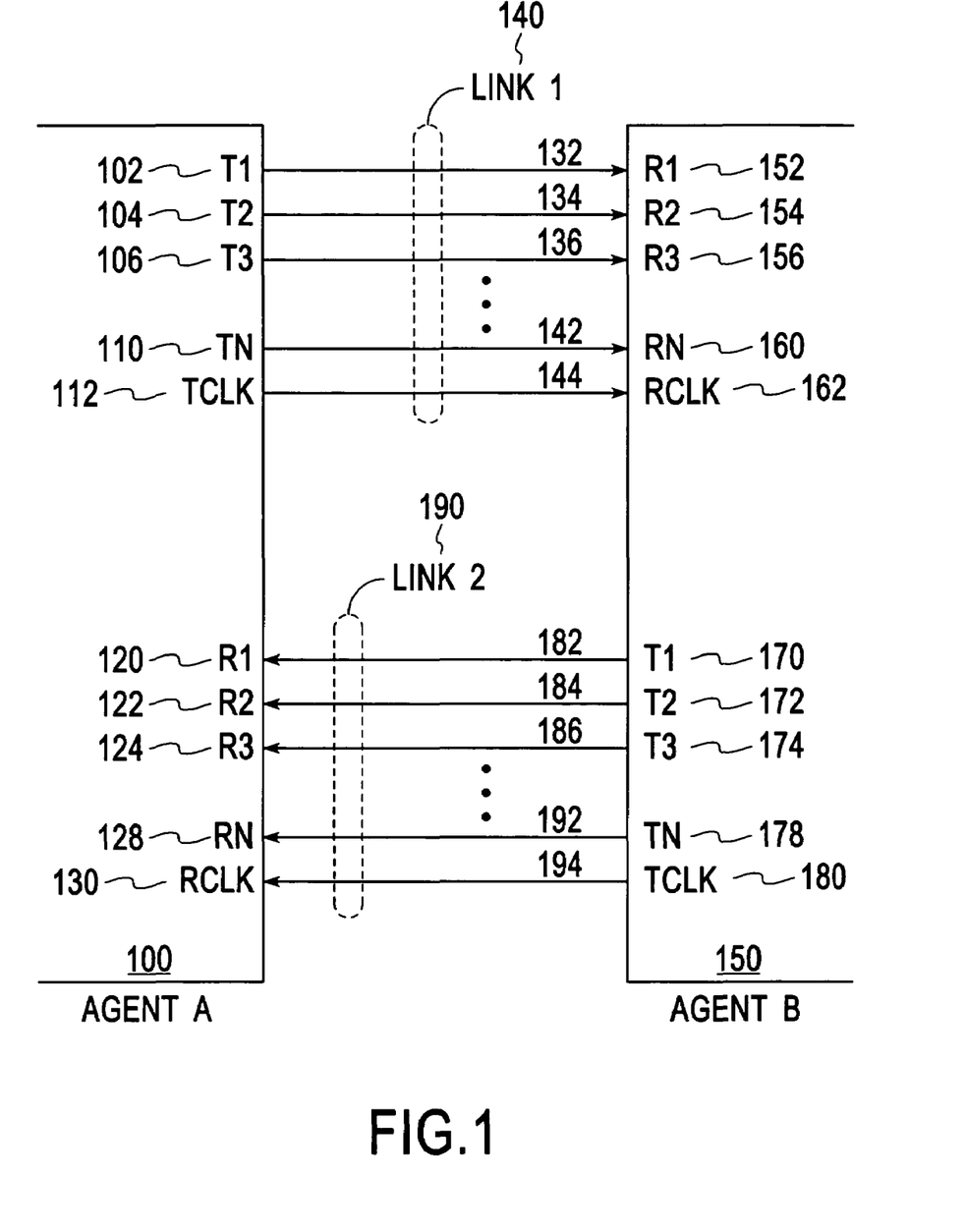
FIG. 1 is a schematic diagram of a pair of agents connected via an interface including a pair of point-to-point links, according to one embodiment of the present disclosure.

Referring now to FIG. 1, a schematic diagram of a pair of agents connected via an interface including a pair of point-to-point links is shown, according to one embodiment of the present disclosure. For the purpose of the present disclosure, an "agent" may be a processor, digital signal processor, memory controller, input/output controller, chipset, or any other functional circuit that connects to another functional circuit via the interface under consideration. Agent A 100 may be connected to a link 1 140 for transmitting data to agent B 150 and a second link 2 190 for receiving data sent by agent B 150. Link 1 140 and link 2 190 may be said to form an interface between agent A 100 and agent B 150.

Agent A 100 may have series of lane transmitters T1 102 through TN 110 and a clock transmitter TCLK 112 for sending data across link 1 140. In other embodiments, the external clock transmitter may be omitted and the lane transmitters may send self-clocked data. Agent B 150 may have a series of lane receivers R1 152 through RN 160 and a clock receiver RCLK 162 to receive the data and clock sent by agent A 100. Similarly, Agent B 150 may have series of lane transmitters T1 170 through TN 1178 and a clock transmitter TCLK 180 for sending data across link 2 190. In other embodiments, the external clock transmitter may be omitted and the lane transmitters may send self-clocked data. Agent A 100 may have a series of lane receivers R1 120 through RN 128 and a clock receiver RCLK 130 to receive the data and clock sent by agent B 150.

The link 1 140 and link 2 190 are shown as including interconnecting lanes for physical transport between agents A 100 and B 150. The lanes in various embodiments may be unbalanced or balanced, differentially-driven. The number of lanes N may be any number. In some embodiments, when soft errors or hard errors in one or more lane are detected, those lanes may be ignored and the link may be configured for operation as a parallel interface with fewer than N lanes.

The signal path lengths and impedances of lanes 132, 134, 136, up to 142 may have significant differences, which may cause differing signal propagation times. This may cause unacceptable skews between lanes. For this reason, an initialization process may be undertaken upon power-on or other system reset activity. The initialization process may train the individual receivers R1 152 through RN 160 to compensate for skew and other anomalies to permit efficient operation of link 1 140 as a parallel data interface. Similarly the initialization process may train the individual receivers R1 120 through RN 128 to compensate for skew and other anomalies to permit efficient operation of link 2 190 as a parallel data interface.

In one embodiment, a sequence of numbered messages, called "training sequences", may be sent over the individual lanes (132 through 142) temporarily acting during the initialization process as N individual serial interfaces clocked by TCLK 112. The use of the lanes as individual serial interfaces avoids the skew and other anomalies initially present when using link 1 140 and link 2 190 as parallel interfaces. There may be a first type of training sequence, a second type of training sequence, up to a final type of training sequence. Each of these numbered training sequences may pass parameter data for efficiently setting up the link 1 140. An equivalent series of training sequences may be sent on link 2 190. The outcome of the passing of training sequences back and forth across link 1 140 and link 2 190 may be to configure operational parallel interfaces using the lanes of link 1 140 and link 2 190. For example, the first training sequence may exhibit a known data pattern from which intra-lane skew timing may be determined. A second training sequence may pass parametric data about this timing and also about soft and hard data errors detected in the lanes.

Figure 2:
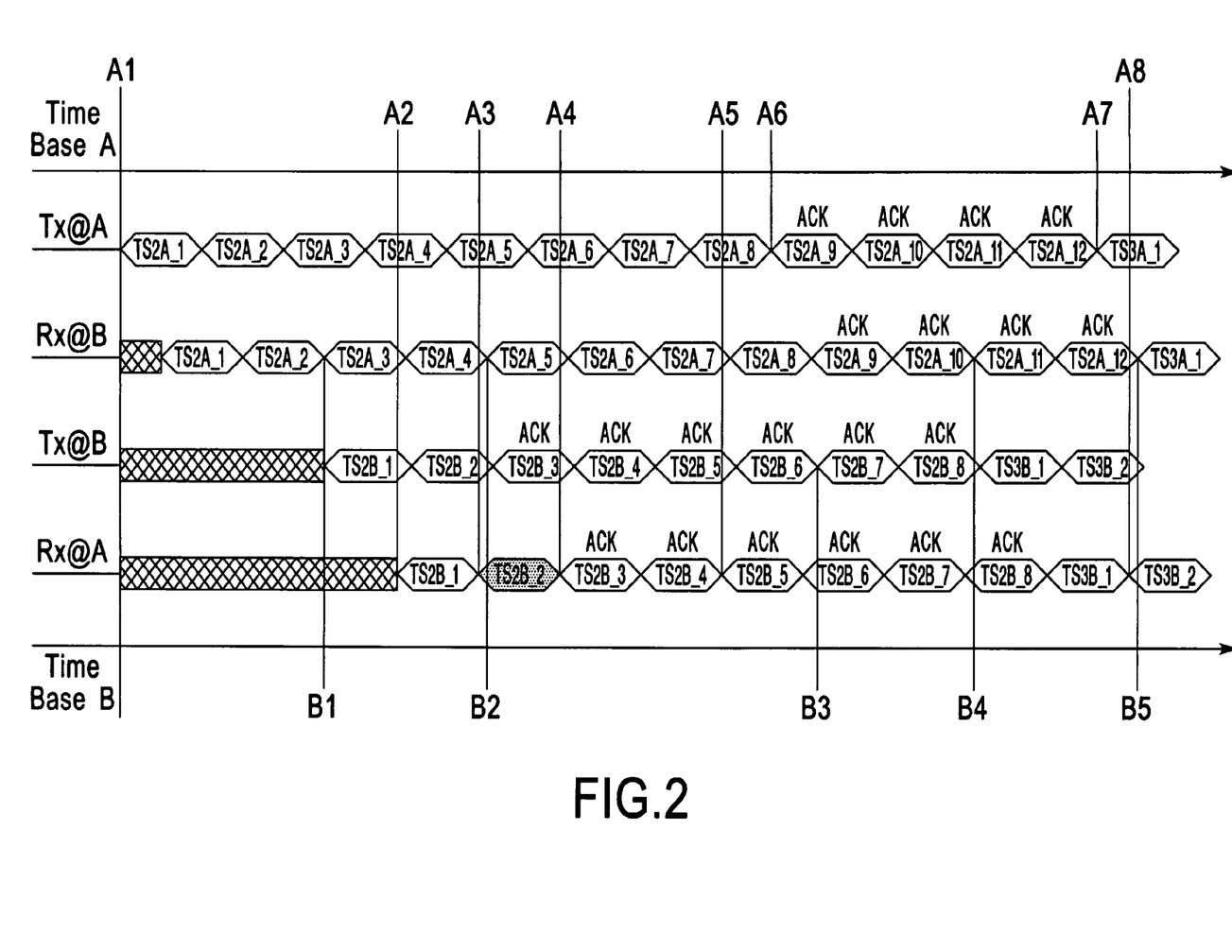
FIG. 2 is a timing diagram showing advancing from one training sequence to the next, according to one embodiment of the present disclosure.

Referring now to FIG. 2, a timing diagram of advancing from one training sequence to the next is shown, according to one embodiment of the present disclosure. It would be possible to send each of the various training sequences for a pre-determined period of time. This would presume that the links would be trained within the collective time period. However, it has been determined that merely using such a timer-based training method would be difficult to validate and also to debug. Therefore, in one embodiment, a fixed time per training sequence has been replaced by a handshaking method that includes acknowledgements.

The FIG. 2 embodiment shows a representative lane from transmitter Tx of agent A sending to receiver Rx of agent B, and corresponding lane in the reverse direction from transmitter Tx of agent B sending to receiver Rx of agent A. Each of the transmitters Tj of agents A and B may send the training sequences in serial form during the initialization process as described above in connection with FIG. 1. Generally what may be received at a given Rx of agent B is what was transmitted at the corresponding Tx of agent A, allowing for a time of flight delay and any errors. FIG. 2 shows events with respect to the two time bases, time base A and time base B, which may be considered with respect to the clocks transmitted by agents A and B, respectively.

FIG. 2 presumes that both agent A and agent B have previously agreed to commence sending the second training sequence message TS2. At time A1, Tx at agent A (Tx @ A) begins transmitting the second training sequence message TS2. It repeats transmitting TS2 as indicated by TS2A_1, TS2A_2, TS2A_3, and so on. These training sequences are received by Rx @ B a short while later. At time B1, Tx @ B begins its transmission of the second training sequence message TS2.

In one embodiment, each agent agrees to begin sending its training sequences, modified to include an acknowledgement, after it correctly receives from the other agent two consecutive current training sequences. In other embodiments, the number of received current training sequences may be more or fewer than 2, and they need not be received consecutively. The selection of 2 consecutive received training sequences as a criteria may help reduce circuit complexity, as only one training sequence may need to be stored in order to compare with an incoming training sequence. The form of the acknowledgement may be a modification of a data pattern, a flag being set somewhere in the training sequence, or any other means of indicating an acknowledgment.

In keeping with this agreement, both agent A and agent B begin to determine whether they have correctly received two consecutive current training sequences from the other agent as soon as they begin transmitting the current training sequence themselves. At time B1, agent B begins transmitting at Tx @ B the current training sequence TS2, and examines the receipt of training sequence TS2 at Rx @ B. As agent A has been sending training sequences TS2 from time A1, at time B2 agent B will have successfully received TS2A_3 and TS2A_4. Therefore agent B has successfully received two of the current training sequences, and may then begin adding an acknowledgment indicator to subsequent transmissions of TS2, starting with TS2B_3. In one embodiment, agent B sends at least 4 of the TS2 messages including an acknowledgement. In other embodiments, few than 4 or more than 4 could be sent.

Because agent B began transmitting at a later time B1, agent A does not begin receiving training sequence TS2 until time A2. The Rx @ A successfully receives TS2B_1, but receives with an error TS2B_2. Only when Rx @ A receives TS2B_3 and TS2B_4, at time A5, does it receive 2 consecutive TS2 messages. Note that these TS2 messages do contain the acknowledgement, but this is permitted. (The second agent to correctly receive the 2 consecutive training sequences may generally be receiving one with an acknowledgement.) Since agent A has received 2 consecutive training sequences at time A5, Tx @ A may then transmit, at time A6, the TS2 messages including an acknowledgement, starting with TS2A_9.

Therefore at time A6 both agent A and agent B are currently transmitting TS2 messages including an acknowledgement. In one embodiment, each agent agrees to begin sending the next in the sequence of training sequences after (1) each agent has begun transmitting the current training sequence including an acknowledgement, and has transmitted at least 4 of these messages and (2) after beginning such transmissions, each agent correctly receives from the other agent two consecutive current training sequences, including an acknowledgement. In other embodiments, the number of received current training sequences including acknowledgement may be more or fewer than 2, and they need not be received consecutively. Additionally, in other embodiments the number of transmitted messages may be more or fewer than 4.

At time B4, agent B has transmitted at least 4 of TS2 including an acknowledgement (TS2B_3 through TS2B_7) and has also subsequently correctly received two consecutive TS2 messages including acknowledgement from agent A (TS2A_9 and TS2A_10). Therefore, agent B may then begin transmitting the next training sequence after TS2, namely TS3, at time B4. The first of these TS3 messages is transmitted from Tx @ B at time B4 (TS3B_1).

Similarly, at time A7, agent A has transmitted at least 4 of TS2 including an acknowledgement (TS2A_9 through TS2A_12) and has also (in this present example) subsequently correctly received two consecutive TS2 messages including acknowledgement from agent B (TS2B_6 and TS2A_7). Therefore, agent A may then begin transmitting the next training sequence after TS2, namely TS3, at time A7. The first of these TS3 messages is transmitted from Tx @ A at time A7 (TS3A_1). (It is noteworthy that the transmission of at least 4 of TS2 including an acknowledgement and correctly receiving two consecutive TS2 messages including acknowledgement from agent B may in fact occur in any order.)

The FIG. 2 example showed handshaking with acknowledgment for a representative pair of lanes Tx @ A-Rx @ B and Tx @ B-Rx @ A between agent A and agent B. It is intended that the transmissions of training sequences may take place across all of the lanes. In this case, if there is an error in reception on one lane (e.g. TS2B_2), then that lane may disregard the corresponding training sequence for the purpose of changing from transmitting a training sequence to transmitting the training sequence with acknowledgement, or for the purpose of changing from transmitting one training sequence to transmitting a subsequent training sequence. In some embodiments, the lanes encountering many soft errors, or a hard error, may be removed from the handshaking process.

Figure 3:
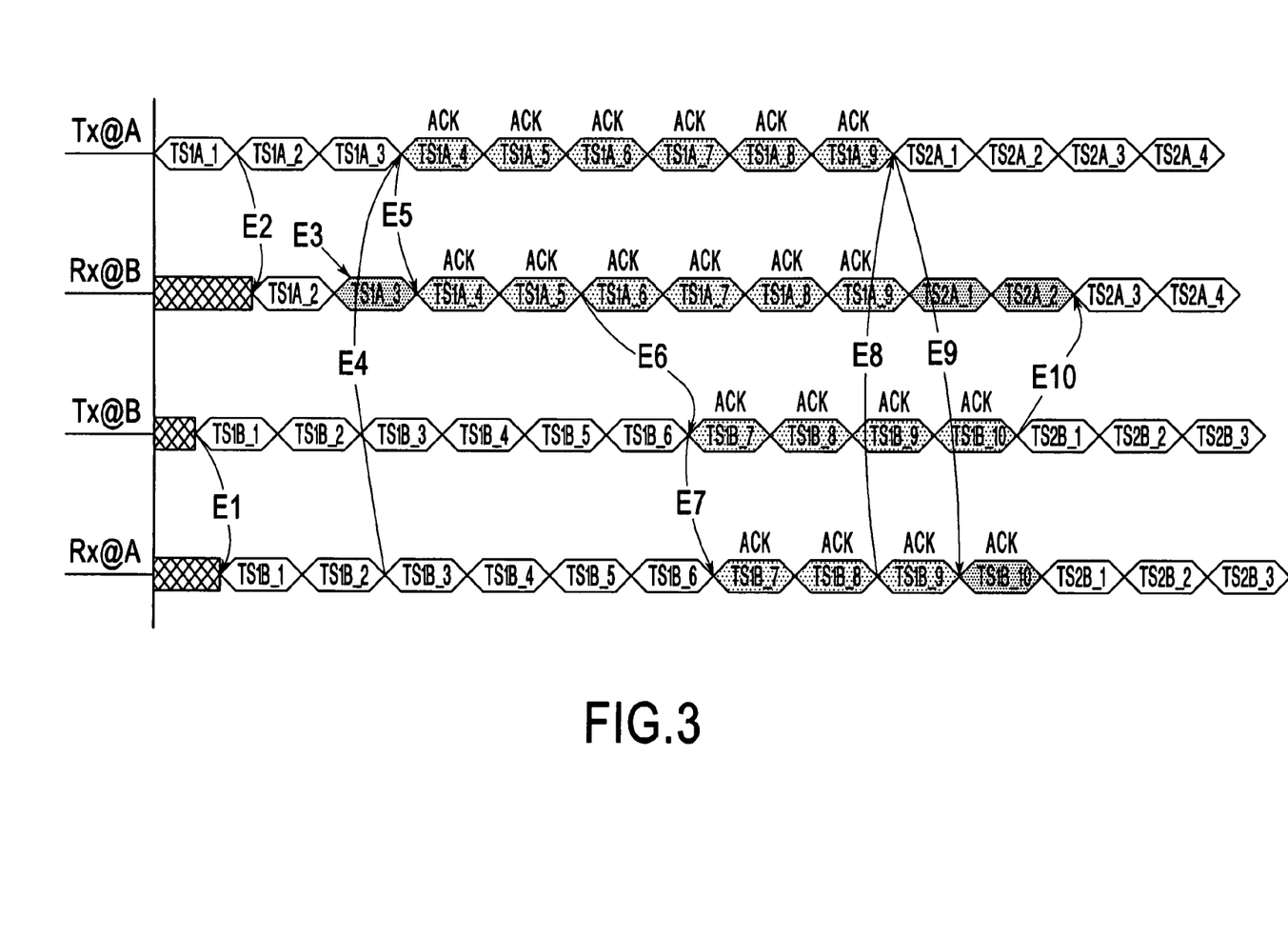
FIG. 3 is a timing diagram showing advancing from one training sequence to the next, according to one embodiment of the present disclosure.

Referring now to FIG. 3, a timing diagram of advancing from one training sequence to the next is shown, according to one embodiment of the present disclosure. The same rules for agreement for advancing from transmitting a training sequence to transmitting the training sequence with acknowledgement, or for the purpose of changing from transmitting one training sequence to transmitting a subsequent training sequence discussed above in connection with FIG. 2 may be applied in FIG. 3 as well.

At event E1, a first training sequence TS1B_1 may be sent from Tx @ B and received at Rx @ A. At event E2, a corresponding first training sequence TS1A_2 may be sent from Tx @ A and received at Rx @ B. At event E3, Rx @ B may receive with error a second TS1 from Tx @ A, and therefore the Rx @ B may discard any history (e.g. TS1A_2 and TS1A_3).

At event E4, the Rx @ A has correctly received 2 consecutive training sequences (TS1B_1 and TS1B_2), so starting with TS1A_4 the Tx @ A may begin transmitting at least 4 training sequences including acknowledgement. Then from event E5 to event E6, Rx @ B may correctly receive two consecutive training sequences (in this case including acknowledgement) TS1A_4 and TS1A_5. Therefore, at event E7, Tx @ B may begin transmitting at least 4 training sequences including acknowledgement. In other embodiments, the number of training sequences required to be received or transmitted may be different.

At event E8, Rx @ A has correctly received two consecutive TS1 including acknowledgement subsequent to Tx @ A beginning to transmit TS1 including acknowledgement. Therefore Tx @ A may begin sending the next in the sequence of training sequences, TS2, beginning at TS2A_1. At event E9, as agent A has advanced to transmitting TS2, Rx @ A may begin expecting to receive TS2 messages, but will simply ignore older TS1 messages (e.g. TS1B_10) as no longer relevant. Similarly, at event E10, agent B has advanced to transmitting TS2 so Rx @ B may begin expecting to receive TS2 message at that time. Here Rx @ B will simply ignore previously-received TS2 messages (e.g. TS2A_1 and TS2A_2) because they arrived before Rx @ B was ready for them.

Figure 4:
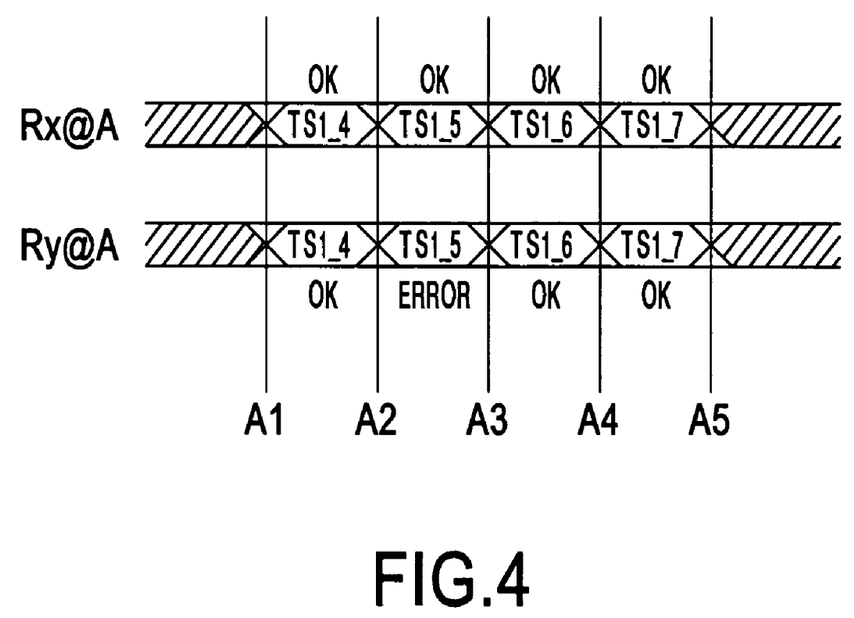
FIG. 4 is a timing diagram showing receiving of training sequences containing acknowledgements at two receivers, according to one embodiment of the present disclosure.

Referring now to FIG. 4, a timing diagram of receiving of training sequences containing acknowledgements at two receivers is shown, according to one embodiment of the present disclosure. Here the two receivers are Rx @ A and Ry @ A of agent A. At time A1, agent A begins looking for 2 consecutive training sequences with acknowledgement. Rx @ A and Rx @ B both successfully receive TS1_4. But then Rx @ A successfully receives TS1_5, while Ry @ A receives TS1_5 with an error. Although at time A3 Rx @ A has received 2 consecutive training sequences with acknowledgement, Ry @ A has not. Therefore agent A does not proceed to transmitting TS2 messages, but waits until Ry @ A has received 2 consecutive training sequences with acknowledgement. Only at time A5, after Ry @ A has successfully received TS1_6 and TS1_7, may agent A proceed to transmitting TS2 messages. In other embodiments, the number of training sequences to receive may be fewer than or greater than 2.

Figure 5:
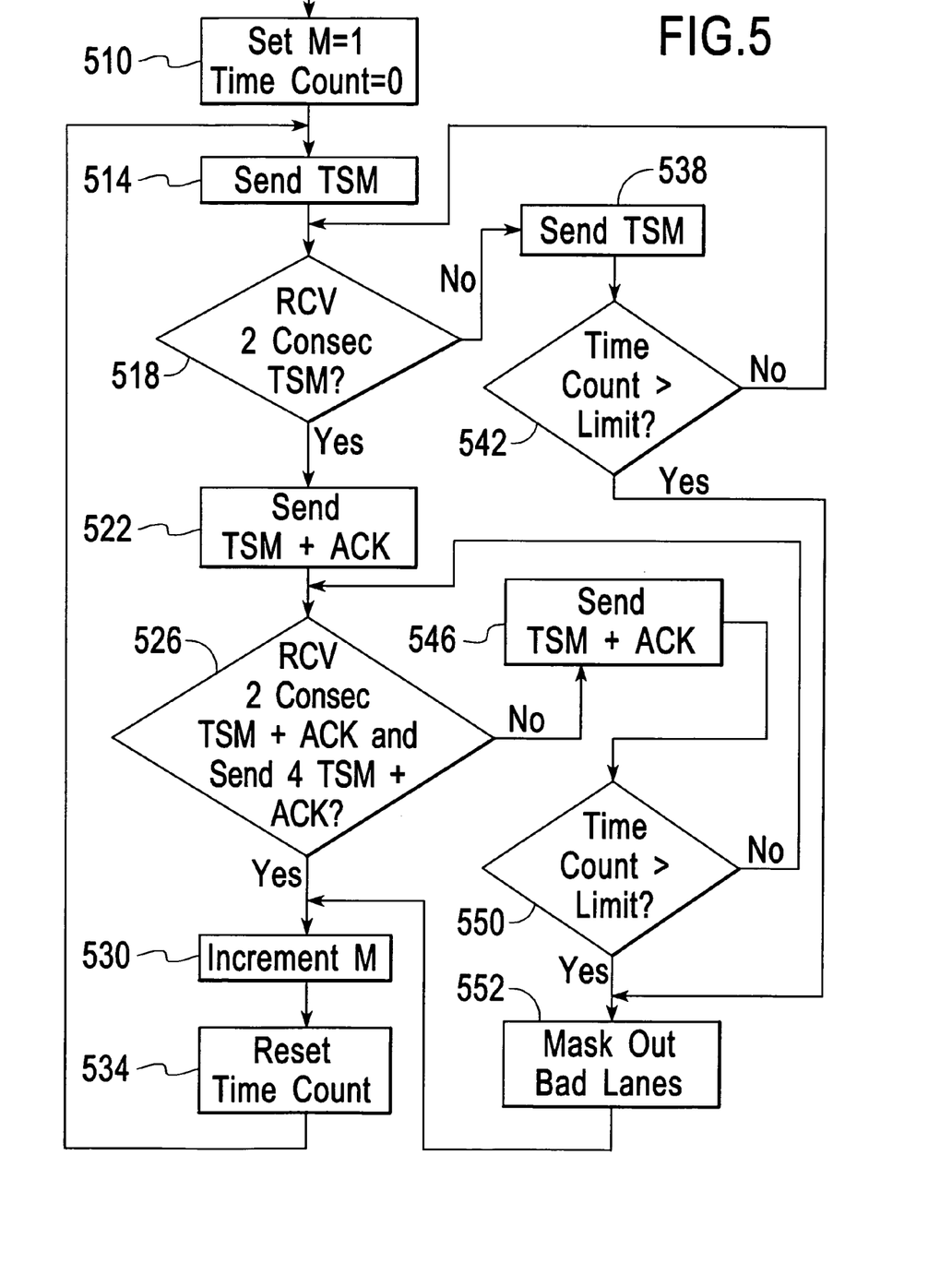
FIG. 5 is a flowchart showing the advancement from one training sequence to the next, according to one embodiment of the present disclosure.

Referring now to FIG. 5, a flowchart of the advancement from one training sequence to the next is shown, according to one embodiment of the present disclosure. The FIG. 5 flowchart shows the actions taken by one specific agent, and references to "send" or "receive" are with respect to that agent. At block 510 the number M of the training sequence is initialized at 1. (A time count for supporting a timeout may also be initialized to 0 at this time.) Then in block 514 the training sequence message TSM is transmitted. In decision block 518, it is determined whether 2 consecutive TSM messages have been correctly received. In other embodiments, more than 2 or fewer than 2 messages may be examined. Here the TSM messages may or may not include an acknowledgment. If 2 consecutive TSM messages have not been correctly received, then the process exits decision block 518 via the NO path, and in block 538 another TSM message may be sent. Then in decision block 542 it may be determined whether the current time count exceeds a limit. If not, then the process exits via the NO path and re-enters decision block 518. If so, then the process exits via the YES path and enters block 552.

When in decision block 518 it is determined that 2 consecutive TSM messages have been correctly received, then the process exits via the YES path and in block 522 TSM messages with acknowledgment may begin being sent. In one embodiment, 4 of these TSM messages with acknowledgement may be eventually sent. In other embodiments, fewer than 4 or more than 4 TSM messages with acknowledgement may be eventually sent. Then in decision block 526, it may be determined whether 2 consecutive TSM messages with acknowledgement have been correctly received and whether 4 TSM messages with acknowledgement have been sent. (Note that if any of the TSM messages sent in blocks 514 or 538 were TSM messages with acknowledgement, these should be included in the count determined in decision block 526.) In other embodiments, more than 2 or fewer than 2 received TSM messages with acknowledgement may be examined. If 2 consecutive TSM messages with acknowledgement have not been correctly received, or 4 TSM messages with acknowledgement have not been sent, then the process exits decision block 526 via the NO path, and in block 546 another TSM message including acknowledgement may be sent. Then in decision block 550 it may be determined whether the current time count exceeds a limit. If not, then the process exits via the NO path and re-enters decision block 526. If so, then the process exits via the YES path and enters block 552.

When either decision block 542 or decision block 550 exits via the YES path, the fact that the current time count exceeds a limit indicates a problem with one or more of the lanes. Therefore in block 552 some of the lanes, including lanes where the time limit was exceeded, may be removed from further consideration during the process. In one embodiment, standard subsets of the lanes may be removed and the interface may proceed with the remaining subsets of the lanes. For example, the subsets may be either one quarter or one half of all of the lanes, and the interface may proceed with either the remaining three quarters or one half, respectively, of the lanes. After block 552, the process then enters block 530.

When in decision block 526 it is determined that 2 consecutive TSM messages with acknowledgment have been correctly received, and that 4 TSM messages with acknowledgement have been sent, then the process exits via the YES path and in block 530 the training sequence message number M may be incremented. This may cause future sending of training sequences to advance from one training sequence to the next. In block 534 the time count may be reset and the process may repeat at block 514. The TSM now sent at block 514 will be advanced in sequence number.

Figure 6:
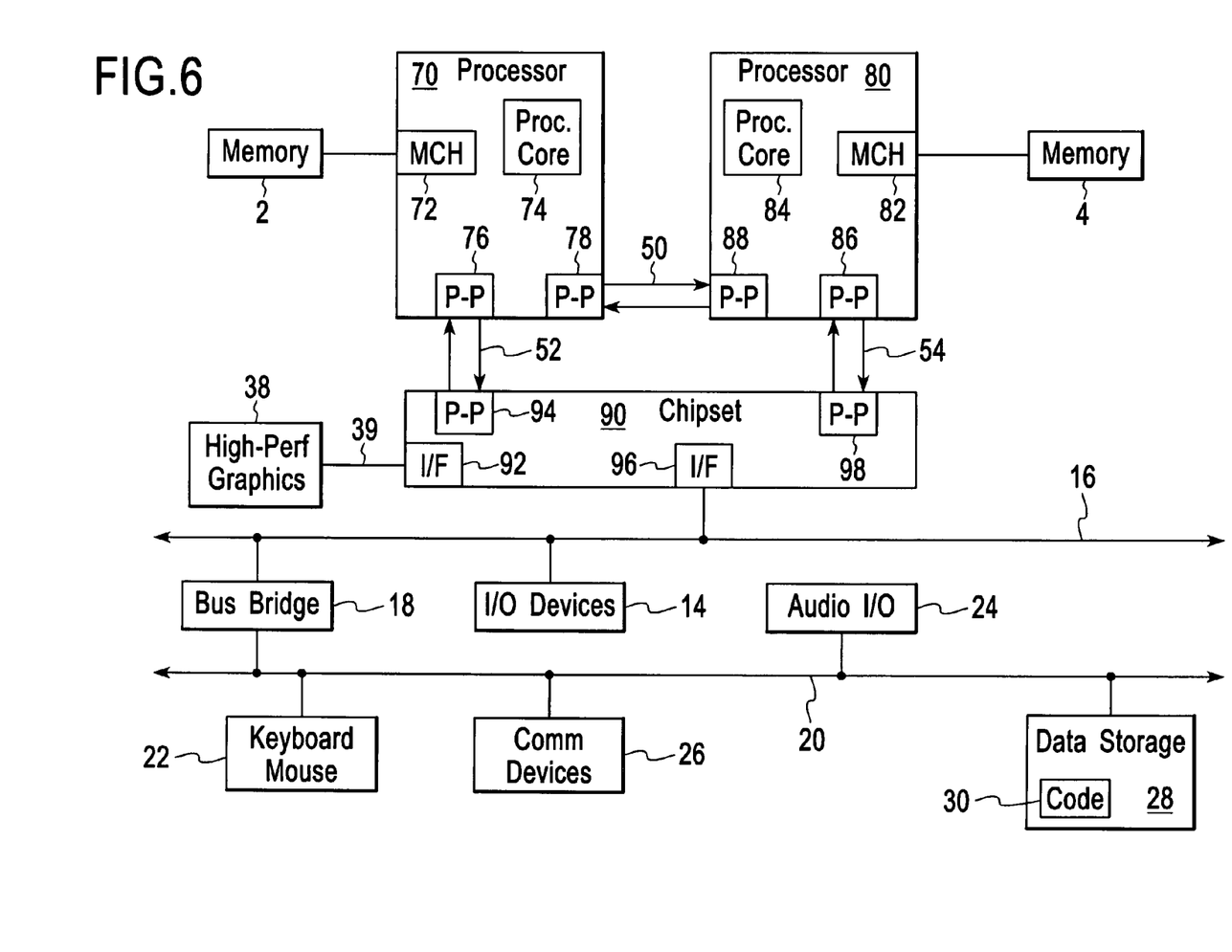
FIG. 6 is a schematic diagram of system including processors supporting an interface including a pair of point-to-point links, according to one embodiment of the present disclosure.

Referring now to FIG. 6, a schematic diagram of system including a processors supporting an interface including a pair of point-to-point links is shown, according to one embodiment of the present disclosure. The FIG. 6 system generally shows a system where processors, memory, and input/output devices are interconnected by a number of point-to-point interfaces.

The FIG. 6 system may include several processors, of which only two, processors 70, 80 are shown for clarity. Processors 70, 80 may each include a local memory controller hub (MCH) 72, 82 to connect with memory 2, 4. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. In one embodiment, point-to-point interfaces 50, 52, 54 may be interfaces as described in FIGS. 1 through 5 of the present disclosure. Chipset 90 may also exchange data with a high-performance graphics circuit 38 via a high-performance graphics interface 92.

In the FIG. 6 system, chipset 90 may exchange data with a bus 16 via a bus interface 96. In the system, there may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An agent, comprising:
a first lane transmitter and a second lane transmitter to send first type of training sequence messages to remote receivers; and
a first lane receiver and a second lane receiver to receive said first type messages from remote transmitters, wherein said first lane transmitter and said second lane transmitter to send said first type messages with acknowledgement over a point-to-point data interface when said first lane receiver and said second lane receiver receive a first number of said first type messages, wherein the first type messages are used by a remote receiver to determine intra-lane skew timing, wherein said first lane transmitter to delay sending said first type messages with acknowledgement until said second lane receiver receives said first number of said first type messages, wherein said first lane transmitter and said second lane transmitter to change from sending the first type of messages to sending a second type of training sequence message only after said first lane receiver and said second lane receiver correctly receive a second number of said first type messages with acknowledgement.

2. The agent of claim 1, wherein said first lane receiver to receive said first number of said first type messages consecutively.

3. The agent of claim 1, wherein said first lane transmitter to further delay sending said first type messages with acknowledgement until a timeout is reached.

4. The agent of claim 3, wherein said first lane transmitter and said second lane transmitter to send an additional said first type messages with acknowledgement when said first lane receiver and said second lane receiver have not received a second number of said first type messages with acknowledgement.

5. The agent of claim 1, wherein said first lane transmitter and said second lane transmitter to send said first type messages with acknowledgement a second number of times.

6. The agent of claim 1, wherein said first lane transmitter and said second lane transmitter to send said first type messages until a timeout is reached when said first lane receiver and said first lane receiver do not receive said second number of said first type messages.

7. The agent of claim 1, wherein the agent one of validates and debugs the point-to-point interface based on the first type of training sequence messages.

8. The agent of claim 1, wherein the first lane transmitter continues sending the first type of training sequence messages only until the first number of the first type messages are received by the first lane receiver.

9. The agent of claim 1, wherein the first type messages with acknowledgement comprise first type training sequence messages including acknowledgement data, and comprise a known data pattern from which intra-lane skew timing may be determined.

10. The agent of claim 9, wherein the first type messages with acknowledgement comprise first type training sequence messages containing an acknowledgement modification of a data pattern or an acknowledgement flag.

11. The agent of claim 10, wherein the first lane transmitter and the second lane transmitter add acknowledgment to first type training sequence messages sent over a point-to-point data interface to acknowledge correctly receiving a first number of the first type of messages.

12. A system comprising:
a first agent with a first lane transmitter to send first type of training sequence messages and a first lane receiver to receive said first type messages; and
a second agent with a second lane transmitter to send first type messages to said first lane receiver and a second lane receiver to receive said first type messages from said first lane transmitter, wherein said first lane transmitter to send said first type messages with acknowledgement over a point-to-point data interface when said first lane receiver receives a first number of said first type messages, wherein the first type messages are used by the second agent to compensate for skew between lanes of a parallel data interface link, wherein the first type messages with acknowledgement comprise a known data pattern from which intra-lane skew timing for the first lane as compared to the second lane may be determined, wherein the first lane transmitter is to change from sending the first type of messages to sending a second type of training sequence messages only after said first lane receiver correctly receives a second number of said first type messages with acknowledgement.

13. The system of claim 12, wherein said first lane receiver to receive said first number of said first type messages consecutively.

14. The system of claim 12, wherein said first agent includes a third lane receiver, and wherein said first lane transmitter to delay sending said first type messages with acknowledgement until said third lane receiver receives said first number of said first type messages.

15. The system of claim 14, wherein said first lane transmitter to further delay sending said first type messages with acknowledgement until a timeout is reached.

16. The system of claim 12, wherein said first agent includes a third lane transmitter, and wherein said first lane transmitter and said third lane transmitter to send said first type messages with acknowledgement a second number of times.

17. The system of claim 16, wherein said first lane transmitter and said third lane transmitter to send additional said first type messages with acknowledgement when said first lane receiver and a third lane receiver of said first agent have not received said second number of said first type messages with acknowledgement.

18. The system of claim 17, wherein said first lane transmitter and said third lane transmitter to change from sending the first type of messages to sending a second type of training sequence message when said first lane receiver and said third lane receiver receive said second number of said first type messages with acknowledgement.

19. The system of claim 18 wherein the first lane transmitter sends the first type of training sequence messages over a first lane to the second lane receiver, a third lane transmitter of the first agent sends the first type of training sequence messages over a second lane to a third receiver of the second agent, and the second type of training sequence messages comprise parametric data about intra-lane skew timing determined for the first and second lane.

20. The system of claim 18 wherein the first lane transmitter sends the first type of training sequence messages over a first lane to the second lane receiver, a third lane transmitter of the first agent sends the first type of training sequence messages over a second lane to a third receiver of the second agent, and the second type of training sequence messages comprise data about soft data errors or hard data errors detected in the first or second lane.

21. The system of claim 12, wherein said first lane transmitter and a third lane transmitter of said first agent to send said first type messages until a timeout is reached when said first lane receiver and a third lane receiver of said first agent do not receive said first number of said first type messages.

22. The system of claim 12, further comprising an audio input/output device.

23. The system of claim 12 wherein the first type of training sequence messages comprise predetermined data messages sent during an initialization process, and the acknowledgement comprises a modification of a data pattern of the predetermined data message.

24. The system of claim 23 wherein the initialization process configures operational parallel interfaces during a power-on or reset activity.

25. The system of claim 12 wherein the first lane transmitter sends the first type of training sequence messages over a first lane to the second lane receiver, a third lane transmitter of the first agent send the first type of training sequence messages over a second lane to a third receiver of the second agent, and the first type of training sequence messages comprise a known data pattern from which intra-lane skew timing for the first lane as compared to the second lane may be determined.

26. The system of claim 12 wherein the first lane transmitter is to send the first type messages with acknowledgment when the first lane receiver receives a first plurality threshold number of the first type messages.

27. The system of claim 26 wherein the first lane transmitter is to send a plurality of the first type messages with acknowledgment.

28. The system of claim 27 wherein the first lane transmitter sends four first type messages with acknowledgment when the first lane receiver receives two of the first type messages.

29. A method, comprising:
sending a first type of training sequence message on a first lane and a second lane;
determining whether a first number of said first type messages has been received on a third lane and a fourth lane;
if so, then sending said first type message with acknowledgement over a point-to-point data interface on said first lane and said second lane, wherein the first type of messages are used to compensate for skew between the first and second lanes, wherein the first type message with acknowledgement comprise a known data pattern from which intra-lane skew timing for the first lane as compared to the second lane may be determined; and
changing from sending said first type of training sequence messages on the first lane to sending a second type of training sequence messages only after correctly receiving a second number of said first type of messages with acknowledgement on the third lane.

30. The method of claim 29, wherein said determining includes determining whether said first number of said first type messages are consecutively received.

31. The method of claim 29, further comprising when said determining determines that said first number of said first type messages has not been received, then sending another first type message.

32. The method of claim 31, further comprising stopping said sending another first type message when a timeout is reached.

33. The method of claim 29, wherein said sending said first type message with acknowledgement includes sending a second number of said first type message with acknowledgement.

34. The method of claim 29, further determining whether a second number of said first type messages with acknowledgement has been received.

35. The method of claim 34, further comprising when said determining determines that said second number of said first type messages with acknowledgement has not been received, then sending another first type message with acknowledgement.

36. The method of claim 35, further comprising when said determining determines that said first number of said first type messages has been received, then change from sending the first type of messages to sending a second type of training sequence message.

37. The method of claim 29 further comprising one of validating and debugging the first lane and the second lane based on the first type of training sequence message.

38. The method of claim 29 further comprising continuing to send the first type of training sequence message only until the first number of the first type messages has been received.

* * * * *